No. 771,067. Patented September 27, 1904.

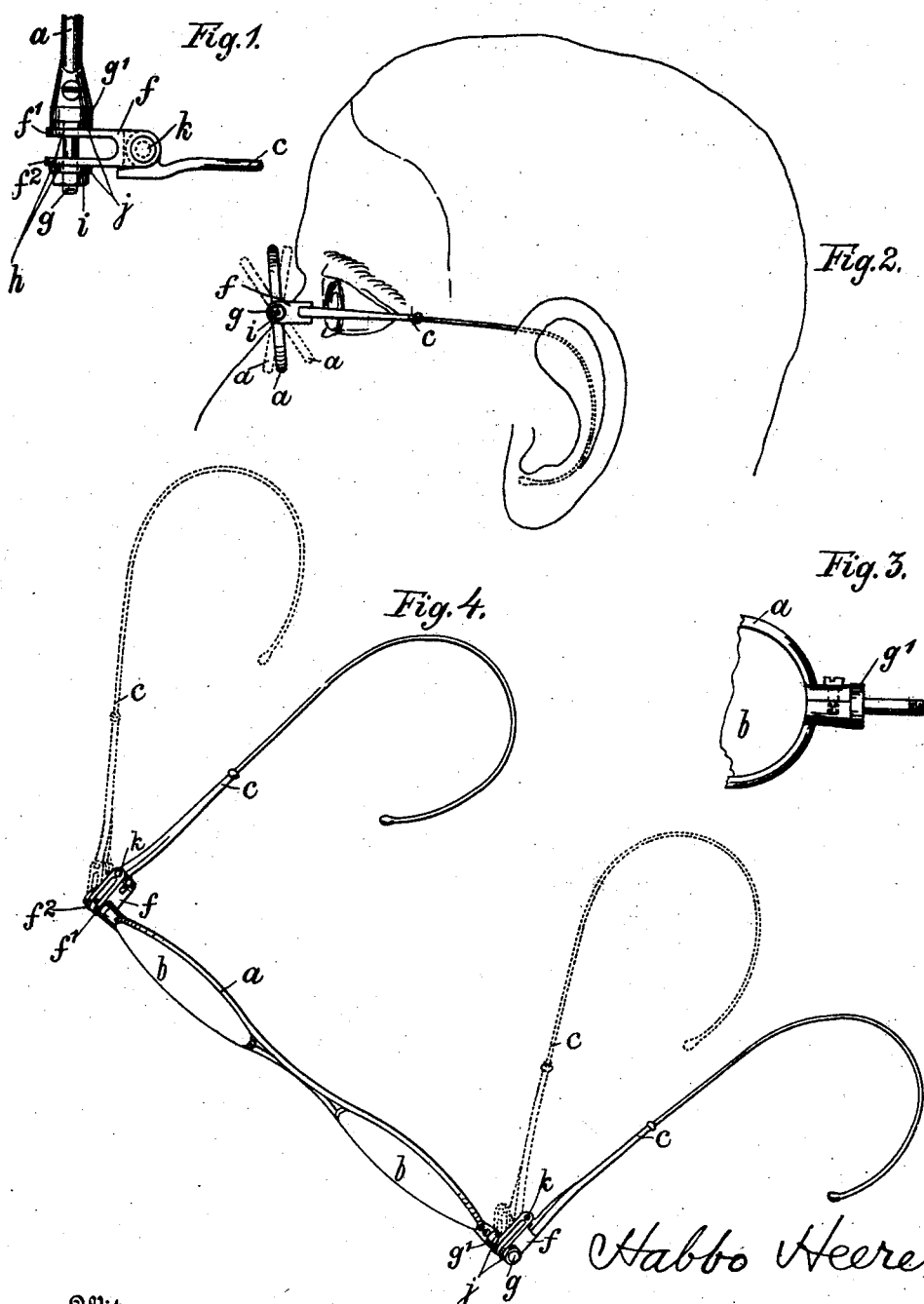

UNITED STATES PATENT OFFICE.

HABBO HEEREN, OF HAMELN, GERMANY, ASSIGNOR OF ONE-HALF TO OTTO W. DEGEN, OF FORT CASEY, WASHINGTON.

SPECTACLES.

SPECIFICATION forming part of Letters Patent No. 771,067, dated September 27, 1904.

Application filed September 21, 1903. Serial No. 174,087. (No model.)

*To all whom it may concern:*

Be it known that I, HABBO HEEREN, a subject of the Emperor of Germany, residing in the city of Hameln, in the Province of Hanover, Germany, have invented certain new and useful Improvements in Spectacles, of which the following is a full, clear, and exact specification.

My invention relates to the construction of spectacle-frames; and it consists of the hereinafter-described improvement in the construction of such frames, whereby the lenses are made axially movable for the purpose, so they may be set in such position relatively to the eyes and to the object viewed that the line of vision will pass through the center of the lenses in whatever position the eye may be required to be raised or lowered to view the object.

My invention is illustrated in the accompanying drawings, wherein—

Figure 1 is a detail plan view, and Fig. 2 a side view, of the joint for connecting the rim of the lenses or the bracket holding the lenses with the temples. Fig. 3 is an elevation of the pivot for connecting the connector with the joint of the rim or bracket holding the lenses, and Fig. 4 is an isometric view of "rimmed" spectacles provided with my improvement.

In the drawings, $a$ designates the rim wherein the lenses $b$ are set.

$c$ designates the temples for holding the spectacles in position in front of the eyes and which may have their ends tapered or curved, as shown in Fig. 4, or may be straight or of any other form.

$f$ is the connector, forming the connection between the temples $c$ and the rim $a$. This connector $f$ is in the form of a U-shaped spring, being bifurcated on the end connected with pivot $g$. (Shown in Fig. 3 in enlarged detail.) This pivot is preferably an integral part of the rim, (or of the brackets when the lenses are not set in a rim.) This pivot is snugly fitted into the bores $h$ of the prongs of connector $f$ and is screw-threaded on its end, so that the connector may be secured thereon by screw-nut $i$. This nut serves also for producing the necessary tension upon the connector. This tension is produced by compressing the prongs $f'$ and $f^2$ of the connector $f$ between the head $g'$ of the pivot $g$ and the screw-nut $i$. For better convenience washers $j$ may be inserted, one to each side of the connector $f$, as shown in the drawings; but they are not essential for the proper operation of the device. Instead of the screw-nut $i$ a rivet-head may be formed on the end of the pivot $g$ after the connector is slid thereon. The other end of the connector $f$ is recessed or bifurcated at right angles to the slot between the prongs $f'$ and $f^2$ and rounded. A bore $k$ is provided therein at right angles to the slot or recess, and the temples $c$ are fitted into the slot or recess and hinged thereto in the usual way. The position of these parts could be changed. By that I mean to say that instead of pivoting the connectors to the rim of the spectacles the socket could be hinged thereto and pivoted to the ends of the temples; but the form described—to wit, the pivoting of the connector to the rim or brackets of the lenses and hinging them to the temples—is preferable and much more effective.

Spectacles provided with the improvement, as herein shown and described, permit the turning of the lenses while the spectacles are set in position in front of the eyes, so that, for instance, a person reading in a sitting position and desiring to view objects on a level with his eyes or higher may so turn the supports of the lenses as to bring them immediately in alinement with the axis of his eyes, or a person walking and desiring to view an object on the ground may by the simple turn of the supports of the lenses adjust the same properly in the line of the vision.

My improved spectacles will be found advantageous for hunters or sharpshooters when compelled to aim in lying position. The capability of adjustment of the lenses will enable such hunters or sharpshooters to aim at the object through the centers of the lenses without unduly straining the muscles of their neck, and at the same time it will avoid the missing of the object, which is due to a refraction of the vision-line, and often happens in such cases when eyeglasses or spectacles are used constructed as heretofore and which do not permit of such an adjustment.

I claim as my invention—

1. The combination, with the supports for the lenses of spectacles, of connectors pivoted to the supports whereby they are rotatable in a plane transverse to the axis of the lens, temples hinged to the connectors, and means independent of the temple hinge-joints for producing spring tension upon the said pivotal joints of the connectors.

2. In a spectacle-frame, the combination with the lens-supports, of a pivot extending outward from the supports at a right angle to the axis of the lenses, a pair of U-shaped resilient members having apertures in their arms at which portions they are rotatable on said pivots, fastening means on the pivots arranged to retain said members under spring tension whereby a resistance is offered to its rotation on the pivot, and a temple hinged to each U-shaped member.

3. In a spectacle-frame, the combination with the lens-supports, of a pivot extending outward from each support at a right angle to the axis of the lens, a pair of socket members each having a forked spring portion containing apertures, said pivots each having one of the socket members rotatable thereon at said apertured portion, a nut on each pivot securing the sockets on the pivots under spring tension whereby resistance is offered to the rotation of said member on the pivot, and a temple hinged to each U-shaped member.

4. In a spectacle-frame, the combination with the lens-supports, of a pivot extending outward from each lens at a right angle to the axis of the supports, a pair of socket members each having a slot at one end, a temple pivoted in each said slot, the socket members each having a forked spring portion containing apertures, said pivots each having one of the socket members rotatable thereon at the said forked portion, and a nut on the end of each pivot securing the sockets on the pivots with the forked portions under tension whereby resistance is offered to the rotation of said member on the pivot.

HABBO HEEREN.

Witnesses:
ANNA DIPPEL,
HERMINE GÖDECKE.